United States Patent [19]

Jansson

[11] Patent Number: 4,777,076
[45] Date of Patent: Oct. 11, 1988

[54] ANTI-SLIDE MAT

[76] Inventor: Einar K. Jansson, Trygarnsvägen 2, S-184 00 Åkersberga, Sweden

[21] Appl. No.: 919,773

[22] Filed: Oct. 15, 1986

[30] Foreign Application Priority Data

Oct. 15, 1985 [SE] Sweden ................................. 8504777

[51] Int. Cl.⁴ ............................ B32B 3/22; B32B 3/12
[52] U.S. Cl. .................................. 428/198; 428/206; 428/323; 428/325; 428/327
[58] Field of Search ................ 428/72, 198, 206, 323, 428/406, 166, 325, 327

Primary Examiner—Alexander S. Thomas
Attorney, Agent, or Firm—Young & Thompson

[57] ABSTRACT

An anti-slide mat for holding a load stationary in the load-storage compartment of, for example, an automotive vehicle, a ship, an aircraft, a train or like vehicle when the vehicle executes an abrupt or sharp change in direction or speed. The mat comprises an upper layer and a lower layer, of which at least one is stretchable or similarly elastic and which layers are attached to one another in a punctiform fashion to define open pocket regions across the area therebetween. Located in each of these pocket regions is a plurality of spherical bodies, the diameter of which lies in a given relationship with the distance between the attachment points defining the pocket region that accommodates the body.

Thus, when the load supported by the mat is subjected to dynamic forces which tend to shift the load, the spherical bodies create an impeding cushion which prevents sliding of the load.

9 Claims, 1 Drawing Sheet

ANTI-SLIDE MAT

The present invention relates to an anti-slide mat for preventing sliding of a load in the load-storage compartment of an automotive vehicle, a ship, an aircraft, a train, or like vehicle in response to abrupt changes in speed and/or direction of said vehicle, thereby to prevent damage to the load itself and/or to the loading compartment. More specifically, although not exclusively, the invention relates to an anti-slide mat for use in the baggage compartment of automotive vehicles.

There has long been the need for holding items of baggage stationary in, for example, the baggage compartment of automotive vehicles, to safeguard against damage to the baggage items themselves and to the baggage compartment per se. In addition to becoming damaged, or causing damage, loose articles which constantly slip and slide in the baggage compartment of an automotive vehicle are liable to play on the nerves of the driver, which is detrimental to safe driving.

This need is satisfied by means of the present invention, which provides a load-supporting anti-slide mat comprising an upper material layer, a lower material layer which is affixed to the upper layer in punctiform fashion so as to define across the area of the layers a plurality of open pocket regions; and a plurality of spherical bodies arranged between the layers and contained in respective pocket regions defined by said punctiform attachment points. At least one of the aforesaid layers is stretchable and the punctiform attachment of one layer to the other may be effected by vulcanization, welding, popriveting, boss-hole attachment and corresponding methods. These spherical bodies may be made of a plastics material wood, metal, glass or an equivalent material. Thus, the arrangement of the spherical bodies between the two sandwiching layers is such that, when a load resting on the mat is subjected to a dynamic or kinetic force, such as acceleration, retardation, centrifugal force, etc., the spherical bodies will be displaced between the pocket regions so as to form an undulating upper mat surface presenting relatively large load-movement impeding wave form at the extremities of the confines of the load.

The invention will now be described in more detail with reference to an exemplifying embodiment thereof illustrated in the accompanying drawing, in which FIG. 1 is a top plan view of an anti-slide mat according to the invention;

Figure 1:
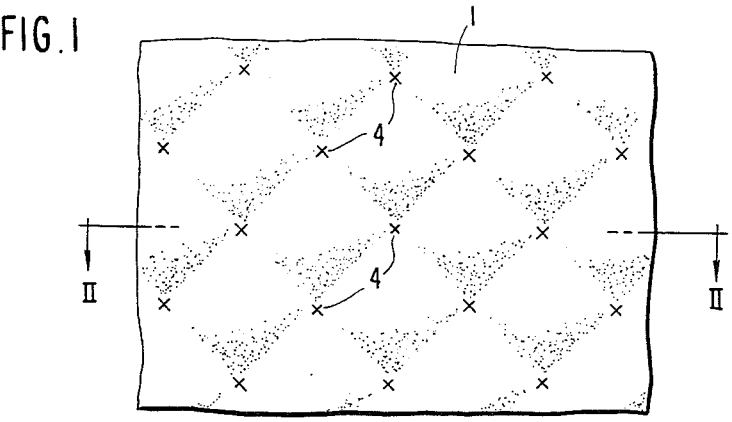
Figure 2:
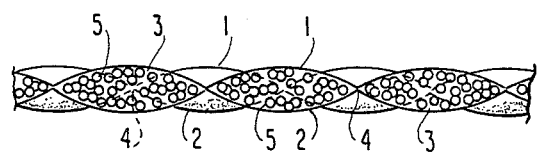
FIG. 2 is a sectional view taken on the line II—II in FIG. 1.

The mat illustrated in FIGS. 1 and 2 comprises an upper layer 1 and a lower layer 2, which are attached together in a punctiform fashion as indicated by attachments 4. The punctiform attachment of the layers may be effected in any suitable manner, such as by welding, vulcanization, pop-riveting, boss-hole attachment, etc., preferably at a distance between mutually adjacent attachment points of from 50 to 200 mm.

Arranged within the respective regions defined by the punctiform attachments 4 are a number of spherical bodies 5, which, as beforementioned, may be made of a plastics material, wood, metal, glass, or some equivalent material, and which have a diameter of from 1 to 10 mm. A preferred material in this regard is a cellular plastic-raw material, such as "Frigolite" ® balls. The relationship between the mutual spacing of the punctiform attachment points 4 within which spherical bodies 5 are confined and the diameter of said bodies lies between 5–200, preferably between 10 and 100 mm.

The aforesaid punctiform attachments 4 are preferably located in a regular pattern, so that the attachment points are at an equal distance apart. This is not absolutely necessary, however, since a satisfactory effect can be obtained with a mat in which the attachment points are of irregular distribution.

It is important, however, that the spherical bodies 5 are able to move to a given extent in their respective pockets defined by mutually adjacent punctiform attachment points 4, and that at least one layer of the mat can be stretched or likewise extended in relation to the other. Accordingly, the spherical bodies occupy from 35 to 70%, preferably from 45 to 55% of the space between the layers 1 and 2 of said mat, and at least one of the layers, 1 or 2, is made of a stretchable or similarly extensible material, such as a stretch textile material, preferably a cross-stretch material, stretch-manchester, a plastics or rubber reinforced textile, a plastics material or some equivalent material.

The anti-slide mat according to the invention provides an effective device against undesirable movement of both heavy and light loads as a result of abrupt dynamic changes in vehicle speed and direction. The efficiency of the mat is not dependent on the location of the centre of gravity of the load above the mat, but is equally as effective with high centres of gravity as with low centres of gravity. The mat will also prevent the movement of such simple items as, for example, bottles, footballs, and other loose articles which can cause irritation when constantly moving around in the baggage compartment of a vehicle. Matting constructed in accordance with the invention can also be placed on the loading platforms of trucks and like transport vehicles, to prevent slipping and sliding of the goods during transportation, something which is often experienced as troublesome by the drivers concerned. The mat according to the invention can also be placed on loading pallets, and safeguard against a load sliding therefrom when subjected to heavy braking.

Figure 3:
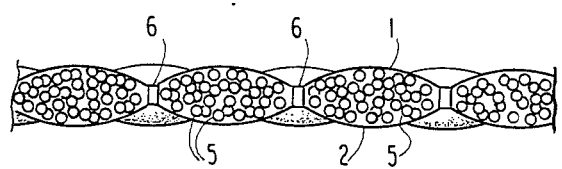
FIGS. 3 illustrates in cross-section a variant of the mat illustrated in FIGS. 1 and 2.

In accordance with a further embodiment of the invention shown in FIG. 3, which is particularly useful in connection with heavy loads, e.g. with loads of up to one ton in weight, at least one of the layers 1 and 2 comprises a hot vulcanized sheet on which posts 6 are moulded at those points at which the two layers are to be connected together, the distances between mutually adjacent posts 6 being 80–200 mm, preferably 100–150 mm, and the height of said posts 6 being 10–40 mm, preferably 15–30 mm. Alternatively, the posts 6 can be moulded on both layers 1 and 2. It will be understood that the ratio between this distance and the diameter of the spherical bodies will be commensurate with that aforementioned.

I claim:

1. An anti-slide mat for preventing sliding of a load in the load-storage compartment of an automotive vehicle, a ship, an aircraft, a train or like vehicle comprising a lower and an upper layer of which at least one is stretchable or likewise extensible, said upper and lower layers being attached to one another in a punctiform fashion over the mutually opposing surfaces thereof to form open pocket regions; and a plurality of spherical bodies which are disposed between said layers in pocket regions defined by said punctiform attachments.

2. A mat according to claim 1, characterized in that the distance between mutually adjacent punctiform attachments and the spherical bodies contained in said pocket regions have a given relationship one to the other.

3. A mat according to claim 1, characterized in that the distance between mutually adjacent punctiform attachments is from 50 to 200 mm, and the diameter of the spherical bodies is from 1 to 10 mm, the ratio of distance to diameter being from 5–200, preferably from 10 to 100.

4. A mat according to claim 1,
characterized in that the spherical bodies fill from 35 to 70%, preferably from 45–55% of the space between the upper and the lower layers.

5. A mat according to claim 1,
characterized in that said at least one stretchable or likewise extensible layer comprises a material selected from the group consisting of stretch textile, plastic-reinforced textile, rubber-reinforced textile, and plastic material.

6. A mat according to claim 1,
characterized in that the spherical bodies are made from a material selected from the group consisting of palstic, wood, metal, glass and preferably comprise cellular plastic-raw materialspheres, such as "Frigolite" ®.

7. A mat according to claim 1,
characterized in that the upper and lower layers are attached to one another by vulcaninzing, welding, popriveting or by boss-hole connection.

8. A mat according to claim 1,
characterized in that at least one of said layers comprises a hot-vulcanized sheet in which posts are moulded at those locations at which the punctiform attachments are formed, and in that the distance between mutually adjacent posts is 80–200 mm, preferably 100–150 mm and the height of respective posts is 10–40 mm, preferably 15–30 mm.

9. A mat according to claim 1,
characterized in that the punctiform attachments have a given, ordered pattern.

* * * * *